March 4, 1952 — M. R. JORDAN — 2,588,245
DISTRIBUTOR FOR WATERING PLANTS
Filed May 24, 1950

Inventor
Morrill R. Jordan
by Roberts, Cushman & Grover
Att'ys

Patented Mar. 4, 1952

2,588,245

UNITED STATES PATENT OFFICE 2,588,245

DISTRIBUTOR FOR WATERING PLANTS

Morrill R. Jordan, Boston, Mass.

Application May 24, 1950, Serial No. 163,987

2 Claims. (Cl. 299—129)

The necessity for watering about the base portion of growing plants, as distinguished from the foliage, is well recognized in order that adequate moisture be absorbed by the soil surrounding the roots. The use of a garden hose is not generally satisfactory for the reason that a heavy stream washes away valuable soil, while a spray does not provide an adequate amount of water where needed, particularly where the plants are in closely spaced rows as in a vegetable garden, or where there is considerable low hanging foliage.

The principal object of the present invention is to provide a simple, efficient, and reliable device for distributing water about the base of plants, and which may be economically manufactured and conveniently manipulated. Further objects will be apparent from a consideration of the following description and the accompanying drawings wherein.

Figure 4:
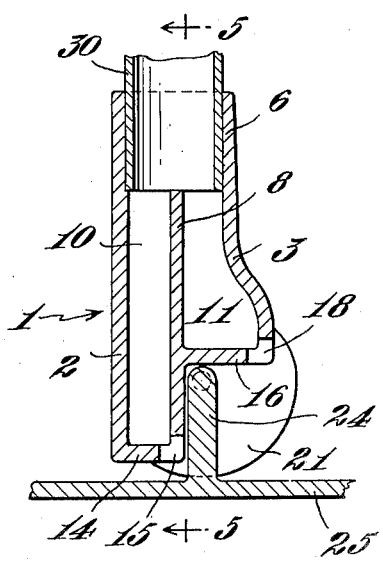
Fig. 4 is an enlarged section on a line 4—4 of Fig. 3.
Figure 5:
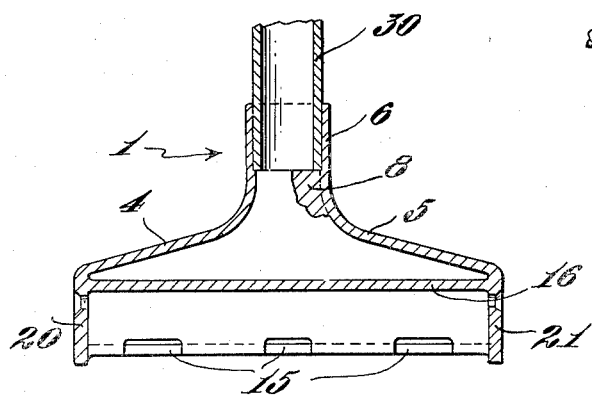
Fig. 5 is a sectional elevation approximately on the line 5—5 of Fig. 4, but showing the deflector plate removed.

The device herein shown for the purpose of illustration comprises an elongate housing having front and rear walls 2 and 3 and end walls 4 and 5 which diverge from tubular inlet 6 at the upper part of the housing. A central vertically extending partition 8, aligned with the inlet 6, extends between the divergent walls 4 and 5 so as to divide the interior of the housing 1 into two elongate chambers 10 and 11, as shown more clearly in Fig. 4. The lower wall 14 of chamber 10 is formed with a plurality of slots or openings 15 which provide water outlets, and the lower wall 16 of chamber 11 is also formed with a plurality of openings 18.

The end walls 4 and 5 are formed with integral extensions 20 and 21 which provide quadrant-like shrouds having rounded free edges. Pivoted to the shrouds by screws 22 and 23 is the upstanding web 24 of a deflector plate 25, the construction and arrangement of parts being such that the web 24 is at all times between the openings 15 and 18 and the curved edges of the shrouds are contiguous to the upper surface of the plate 25, regardless of the angular portion of the plate 25 relative to the housing 1.

Figure 1:
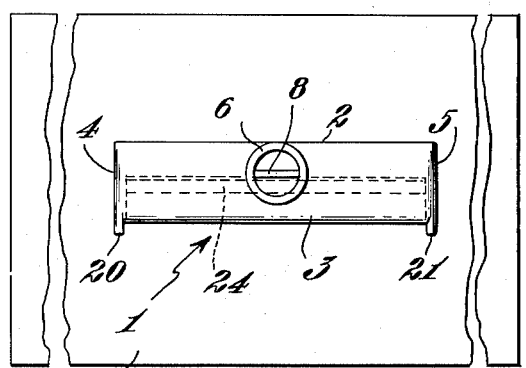
Fig. 1 is a top plan view, with the conduit-handle removed, of my improved water distributor.
Figure 2:
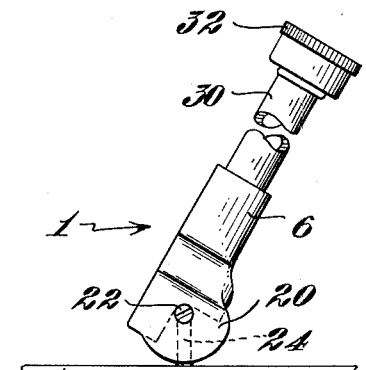
Fig. 2 is a side elevation thereof.
Figure 3:
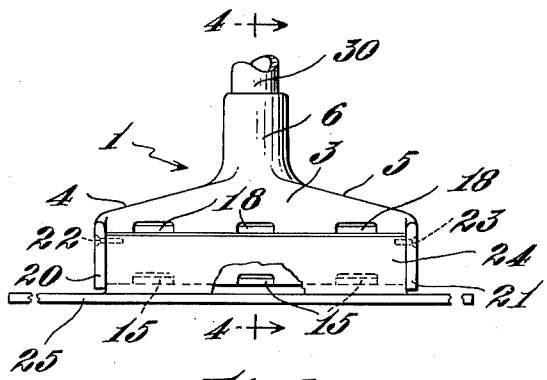
Fig. 3 is a rear elevation.

The tubular upper end 6 receives a rigid conduit 30 which conveniently may be about three feet long and the upper end of the conduit 30 may be provided with a conventional female coupling 32 (Fig. 2) for connecting with a hose. The conduit 30 thus provides an inlet line and a handle by means of which the devices may be manipulated.

It will be noted that the design of the parts is such that the deflector plate 25 may be swung through an angle of about 90° relative to the housing 1, and at all positions the streams of water discharged through the outlet openings 15 and 18 strike the deflector plate 25 so that their velocity is sufficiently reduced so as to be non-injurious to the plant, and the deflector plate further serves to distribute the water about the desired location. Hence, by properly positioning the deflector plate 25 a gentle stream of water may be made to flow about the base of a plant so as to thoroughly soak the soil surrounding the roots without danger of inflecting injury to the plant or washing away valuable soil.

While I have shown and described one desirable embodiment of the invention, it is to be understood that this disclosure is for the purpose of illustration and that various changes and modifications may be made without departing from the spirit and scope of the invention as set forth in the appended claims.

I claim:

1. A water distributing device comprising an elongate horizontal housing having end walls which diverge downwardly from an inlet opening in its upper part and an interior partition extending between said end walls to define front and rear chambers each having outlets in their lower ends, and a horizontally disposed deflector plate having an upstanding centrally disposed web connected to said housing between the outlet openings of each chamber, the body portion of said deflector plate being arranged so as to deflect water discharged through said openings outwardly away from said housing.

2. A water distributing device comprising an elongate horizontal housing having end walls which diverge downwardly from an inlet opening in its upper part and an interior partition extending between said end walls to define front and rear chambers each having outlets in their lower ends, a handle secured to said housing by means of which the device may be manipulated, and a deflector plate having an upstanding centrally disposed web with its ends pivotally secured to the end walls of the housing and extending between the outlet openings of said chambers so that streams of water discharged through said openings strike the upper face of said plate on each side of said web and are deflected outwardly from said housing.

MORRILL R. JORDAN.

REFERENCES CITED

The following references are of record in the file of this patent:

UNITED STATES PATENTS

| Number | Name | Date |
|---|---|---|
| 1,753,754 | Reddermann | Oct. 29, 1929 |
| 1,787,024 | Sjostrom | Dec. 30, 1930 |
| 2,289,889 | Stick et al. | July 14, 1942 |

FOREIGN PATENTS

| Number | Country | Date |
|---|---|---|
| 545,653 | Great Britain | June 5, 1942 |